United States Patent [19]

Warner

[11] Patent Number: 5,071,139
[45] Date of Patent: Dec. 10, 1991

[54] PRESSURE ACTIVATED EMERGENCY/TEMPORARY SEAL

[75] Inventor: Dale J. Warner, Palm Harbor, Fla.

[73] Assignee: A.W. Chesterton Company, Stoneham, Mass.

[21] Appl. No.: 457,396

[22] Filed: Dec. 27, 1989

[51] Int. Cl.$^5$ .......................... F16J 15/38; F16J 15/40
[52] U.S. Cl. ............................................ 277/27; 277/3; 277/9; 277/43; 277/50; 277/58; 277/65; 277/66; 277/73; 277/79; 277/93 R; 277/101
[58] Field of Search ................. 277/27, 28, 58, 65, 277/73, 78, 79, 93 R, 935 D, 3, 9, 9.5, 10, 11, 71, 35–38, 43, 39, 47, 48, 50, 101, 66; 24/648

[56] References Cited

U.S. PATENT DOCUMENTS

| | | | |
|---|---|---|---|
| 1,778,200 | 10/1930 | Nibbs | 277/79 |
| 3,188,096 | 6/1965 | Wilkinson | 277/65 |
| 4,094,512 | 6/1978 | Back | 277/27 |
| 4,204,689 | 5/1980 | Johansson | 277/27 |
| 4,534,569 | 8/1985 | Ishitani et al. | 277/27 |
| 4,541,638 | 9/1985 | Ogawa et al. | 277/9 |
| 4,632,403 | 12/1986 | Ishitani et al. | 277/27 |
| 4,639,000 | 1/1987 | Warner . | |
| 4,688,807 | 8/1987 | Warner . | |
| 4,711,168 | 12/1987 | Held | 277/27 X |
| 4,890,849 | 2/1990 | Eason | 277/58 X |

*Primary Examiner*—William A. Cuchlinski, Jr.
*Assistant Examiner*—James K. Folker
*Attorney, Agent, or Firm*—Hill, Van Santen, Steadman & Simpson

[57] ABSTRACT

A pressurizable seal assembly provides a temporary seal which allows continued operation of a device, for example a pump, when the primary seal is removed for repair or replacement. The seal assembly includes a seal housing having a selectively pressurizable annular chamber with an open inner circumference surround the shaft of the device. An annular seal member is disposed in the annular chamber at the inner circumference thereof, and is actuable by pressure in the chamber to selectively sealingly engage the shaft. When the rotary shaft device has a single primary seal, the pressurizable seal may be provided between the stationary housing and the primary seal. When the primary seal of the rotary shaft device is a tandem seal, the pressurizable seal assembly may be disposed between the first and second primary seals of the tandem seal. The seal housing may be two-piece construction to facilitate its installation on and removal from the rotary shaft. In order to maintain the chamber at a predetermined pressure, a fitting may be provided which may be adapted to be attached to shop air pressure. In an alternative embodiment, an accumulator may be provided to maintain relatively constant chamber pressure. When the seal assembly is provided in combination with the tandem seal, the seal housing may include a receiving portion that forms a stationary sealing surface for one seal member of the tandem seal.

17 Claims, 2 Drawing Sheets

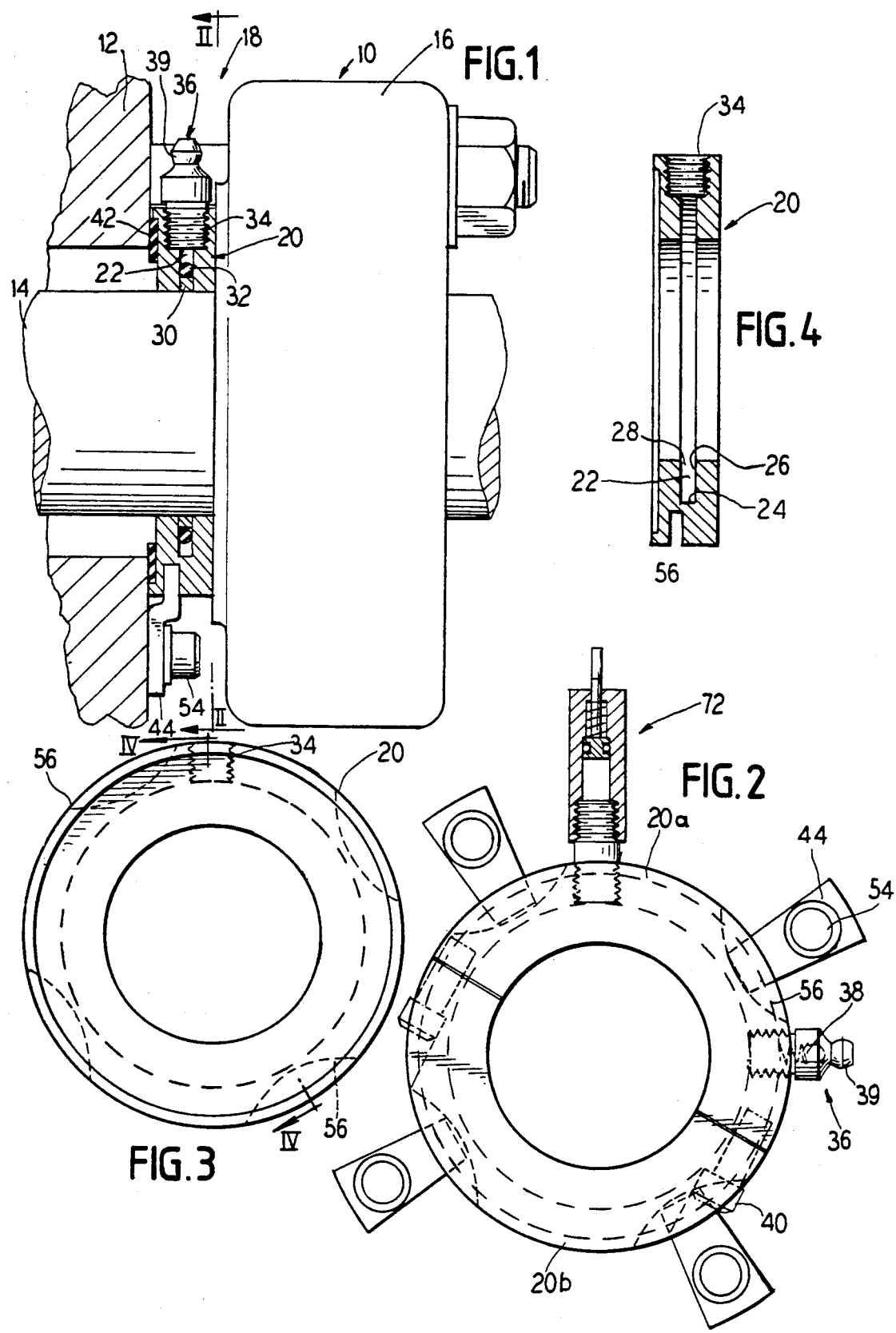

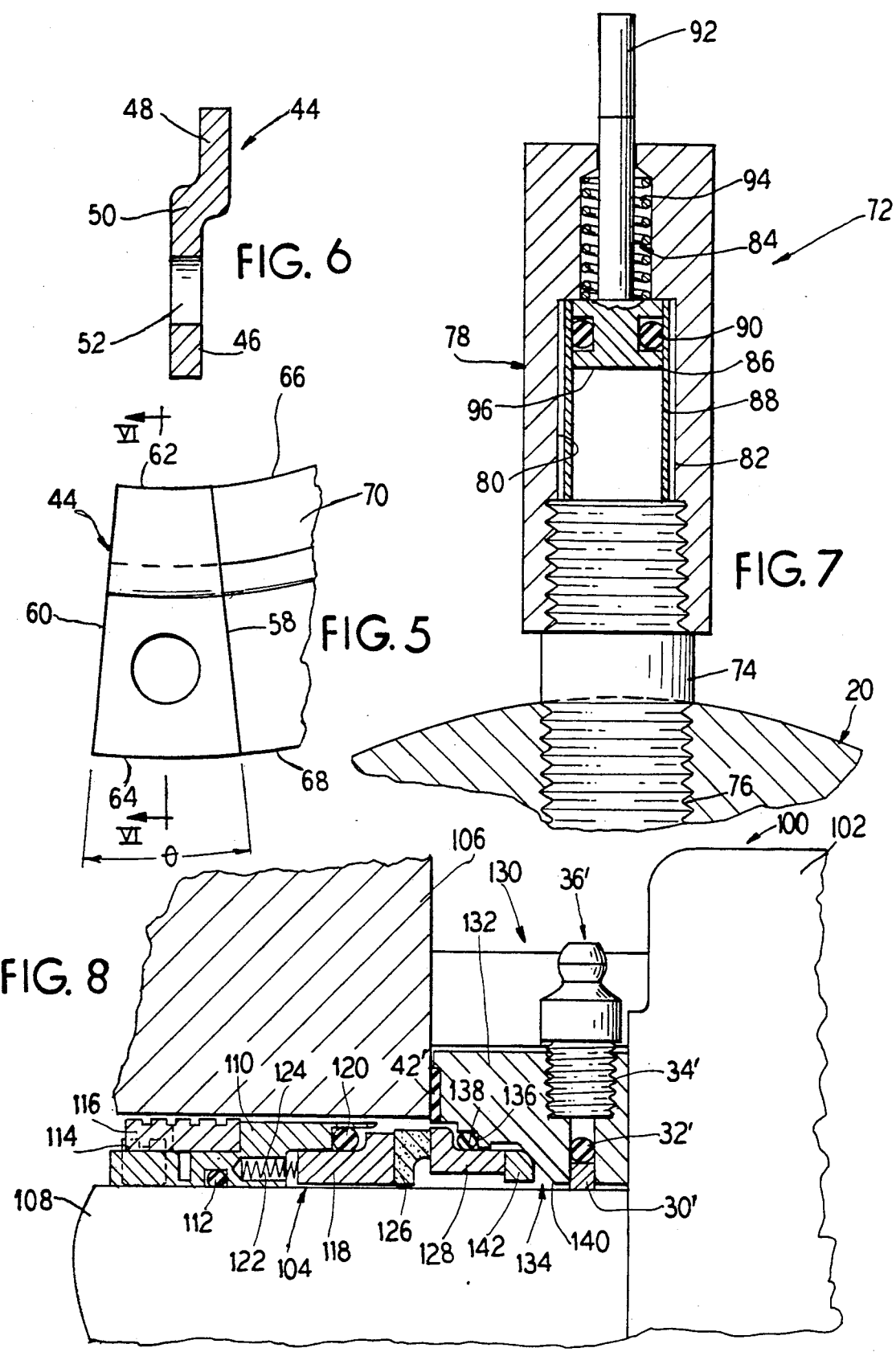

PRESSURE ACTIVATED EMERGENCY/TEMPORARY SEAL

TECHNICAL FIELD

The invention relates generally to selectively actuable rotary shaft seals in devices of the type having a rotary shaft extending from a housing, and particularly to providing, in such devices, a secondary or temporary seal to maintain a sealing condition between the shaft and the housing when the primary seal has been removed for maintenance or replacement.

BACKGROUND OF THE INVENTION

Devices having rotary shafts extending from housings, particularly impeller pumps, are usually provided with a primary seal to maintain a sealed condition between the shaft and the housing. Such seals serve to retain pump fluids, such as lubricants, in the interior of the housing, while preventing the ingress of dirt or other contaminants from the outside of the housing. The primary seal may be provided as a single seal member, or a "tandem seal" including a pair of seal members.

When it becomes necessary to remove the primary seal, either for routine maintenance or emergency replacement, the sealed condition between the housing and the shaft is broken. This not only requires an interruption in operation of the device, but also allows interior fluids to escape, and exposes the interior of the device to contamination. It is often the case in such devices that removal of the primary seal necessitates a partial disassembly and rebuilding of some interior structure, usually bearing components, on the interior of the housing.

The time lost due to seal removal represents a significant expense during the operational life of a rotary shaft device. Therefore, it would be advantageous to provide a method and apparatus by which such lost time and its associated expenses are minimized.

SUMMARY OF THE INVENTION

The present invention contemplates a pressurizable seal assembly that will provide a temporary seal to allow the continued operation of a device, for example a pump, where the primary seal is to be removed for repair or replacement. The seal assembly includes a seal housing having a selectably pressurizable annular chamber with an open inner circumference surrounding the shaft of the device. An annular seal member is disposed in the annular chamber at the inner circumference thereof, and is actuable by pressure in the chamber to selectively sealingly engage the shaft. When the rotary shaft device has a single primary seal, the pressurizable seal may be provided between the stationary housing and the primary seal. When the primary seal of the rotary shaft device is a tandem seal, the pressurizable seal assembly may be disposed between first and second primary seals of the tandem seal.

The seal housing of the invention may be of two-piece construction to facilitate its installation on and removal from the rotary shaft. In this embodiment, the seal housing is symmetrically split into generally C-shaped sections, which are then selectively secured together by fasteners.

The pressurizable seal may be attached to the stationary housing with a series of clips that are adapted to engage a corresponding number of recesses formed in the periphery of the seal housing. In an illustrative embodiment, the clips are formed with angled sides joined by arcuate front and rear edges. This configuration results from the clips having been advantageously fabricated from a single ring of material.

The pressurizable seal includes a fitting disposed in a radial bore through the seal housing that is in fluid communication with the annular chamber. The fitting is attachable to a source of pressurized fluid to selectively pressurize the annular chamber. In order to maintain the chamber at a predetermined pressure, the fitting may be adapted to be attached to shop air pressure. If shop pressure is unavailable, an accumulator may be provided in a second bore that passes through the housing and is in fluid communication with the annular chamber.

The annular chamber in the seal housing is defined by an open inner circumference, a pair of side walls, and an annular outer wall substantially concentrically surrounding the open inner circumference. An O-ring, in sealing contact with the side walls and the seal member, may be concentrically disposed between the seal member and the annular outer wall. The seal member itself may be provided as a length of packing material corresponding to the circumference of the rotary shaft.

When the present invention is provided in combination with a tandem seal arrangement, the seal housing may include a receiving portion that forms a stationary sealing surface for one seal member of the tandem seal.

Other objects and advantages of the present invention will become apparent upon reference to the accompanying description when taken in conjunction with the following drawings.

BRIEF DESCRIPTION OF THE DRAWINGS

FIG. 1 is a side sectional view, partially broken away, of a first embodiment of the present invention.

FIG. 2 is a sectional view taken generally along line II—II of FIG. 1.

FIG. 3 is an elevational view of a seal housing.

FIG. 4 is a sectional view taken along line IV—IV of FIG. 3.

FIG. 5 is an elevational view of a retaining clip.

FIG. 6 is a sectional view taken generally along line VI—VI of FIG. 5.

FIG. 7 is a sectional view of an accumulator that may be used with the present invention.

FIG. 8 is a sectional view of a second embodiment of the present invention.

DETAILED DESCRIPTION OF THE PREFERRED EMBODIMENTS

FIG. 1 shows a rotary shaft device 10 including a housing 12 and a rotary shaft 14. A primary seal 16 is provided to affect a sealing condition between the pump housing 12 and the shaft 14.

A pressurizable seal assembly 18 is provided between the primary seal 16 and the housing 12. The pressurizable seal assembly 18 includes an annular seal housing member 20 in which is formed an annular chamber 22. The chamber 22 is defined by an annular outer wall 24, a pair of side walls 26, and an open inner circumference 28 (FIGS. 3 and 4).

The seal assembly 18 includes a seal member 30, which may be formed from a length of packing material cut to correspond to the circumference of the shaft 14. The seal member 30 is surrounded by an O-ring 32 that is in contact with the side walls and the seal member 30.

The seal housing 20 is provided with a bore 34 in which is disposed a zircon fitting 36. The fitting 36 incorporates a one way valve 38, and is provided with a nipple 39 for attachment to a source of pressurized fluid (not shown), preferably compressed air.

As shown in FIG. 2, the seal housing 20 may be split into halves 20a and 20b to facilitate their installation and removal. The housing halves 20a and 20b may be secured together by bolts 40 or any suitable fastener.

A gasket 42 may be provided between the seal housing 20 and the stationary housing 12 to enhance the sealing therebetween. The seal housing 20 may be secured to the stationary housing 12 by means of a plurality of clips 44 as shown in FIGS. 2, 5 and 6. Each of the clips 44 includes a securing portion 46 and an engagement portion 48 connected by an offset 50. The securing portions 46 are provided with bores 52 so that the clips 44 may be secured to the stationary housing 12 using bolts 54. The engagement portions 48 are received in recesses 56, provided at generally regular intervals, in the periphery of the housing 20. As can be seen in FIG. 5, the clips 44 include sides 58 and 60 disposed from one another by an angle Θ. The sides 58 and 60 terminate at an arcuate inner edge 62 and an arcuate outer edge 64. The edges 62 and 64 are defined by the intersection of the sides 58 and 60 with a pair of concentric circles 66 and 68. As a result of this configuration, a plurality of the clips 44 may be cut from a single ring 70 of suitable material.

As seen in FIGS. 2 and 7, the seal assembly 18 may be provided with an accumulator 72 to maintain a constant and predetermined pressure in the chamber 22. The accumulator 72 is in communication with the chamber 22 via an adaptor 74 fitted into a bore 76 in the seal housing 20. The accumulator 72 includes a housing 78 in which is formed a stepped bore 80 including a first bore portion 82 and a second bore portion 84. A piston 86 is axially reciprocable in a cylinder 88 disposed in the first bore portion 82. An O-ring 90 provides sealing contact between the piston 86 and the cylinder 88. A tell-tale 92 extends from the piston 86 through the second bore portion 84 and out of the housing 78. A resilient member 94 disposed in the second bore portion 84 biases the piston 86 against the force of pressure in the chamber 22, which acts through the adaptor 74 against the piston face 96. Thus, by selecting the biasing force of the spring 94 in relation to the volume of the chamber 22, the volume of the cylinder 88, and the area of the piston face 96, the accumulator 72 maintains a constant pressure in the chamber 22.

FIG. 8 illustrates a second embodiment of the present invention wherein a tandem seal arrangement 100, including a first seal member 102 and a second seal member 104, is used to affect a sealed condition between a stationary pump housing 106 and a shaft 108. The first seal member 102 is of the same general type as primary seal 16 shown in FIG. 1. The second seal member 104 is a slip-ring seal.

The seal member 104 includes a shaft sleeve 110 sealed to the shaft 108 with an O-ring 112, and attached to the shaft 108 with a plurality of set screws 114 or similar fasteners. A particle seal sleeve 116 is disposed between the shaft sleeve 110 and the stationary housing 106 to prevent the ingress of particles to the mating surfaces of the second seal member 104. A seal ring adaptor 118 is provided between the shaft sleeve 110 and the shaft 108. An O-ring 120 provides a seal between the seal ring adaptor 118 and the shaft sleeve 110, and a plurality of springs 122 are located in a corresponding number of blind bores 124 in the shaft sleeve 110. A seal ring 126 is carried by the seal ring adaptor 118, and is biased into sealing engagement with a hard face seal 128 by the springs 122.

A pressurizable seal housing 130 includes a receiving portion 132 in which is formed a socket 134. The socket 134 provides a recess 136 in which is seated an O-ring 138. The O-ring 138 provides a seal between the hard face seal 128 and the receiving portion 132 of the seal housing 130. The socket 134 also includes a conical surface 140 which provides a seating surface for a slip ring 142 that engages the hard face seal 128. The seal 104 accommodates angular displacement between the axis of the hard face seal 120 and the axis of the socket 134.

Operation of the pressurized seal assembly 18 is as follows. The chamber 22 is pressurized through the fitting 36 to constrict the O-ring 32 around the seal member 30 and into sealing engagement with the circumference of the shaft 14. The primary seal 16 may then be removed. Sealing contact between the seal member 30 and the shaft 14 thus permits operation of the device 10 after the primary seal 16 has been removed for repair or replacement. Upon replacement of a primary seal, the chamber 22 is depressurized. Thereafter, continued operation of the device 10 and rotation of the shaft 14 will cause the seal member 30 to recede into the chamber 22, and thus substantially eliminate frictional resistance between the seal member 30 and the shaft 14.

Operation of the pressurized seal assembly 130 is similar to that of pressurized seal assembly 18.

Although the present invention has been described with reference to a specific embodiment, those of skill in the art will recognize that changes may be made thereto without departing from the scope and spirit of the invention as set forth in the appended claims.

I claim as my invention:

1. In a device having a rotary shaft and a stationary housing, a pressurizable seal assembly comprising the following:
   a seal housing including a selectively pressurizable annular chamber having an open inner circumference surrounding said shaft;
   an annular seal member disposed in said chamber at said inner circumference and being actuable by pressure in said chamber to selectively sealingly engage said shaft; and
   attachment means for sealingly securing said seal housing to said stationary housing, said attachment means including at least one clip secured at an outer periphery of said seal housing and removably fastened to said stationary housing, and at least one recess on said periphery of said seal housing corresponding to and adapted to receive said at least one clip.

2. A pressurizable seal assembly according to claim 1, further wherein:
   said device further comprises a primary seal effecting a sealed condition between said shaft and said stationary housing; and
   said pressurizable seal assembly is a secondary seal disposed between said stationary housing and said primary seal.

3. A pressurizable seal according to claim 2, further wherein said seal housing is of a two-piece construction to facilitate its installation on, and removal from, said rotary shaft.

4. A pressurizable seal according to claim 3, further wherein said seal housing is symmetrically split into generally C-shaped sections, said sections being selectively secured together by fasteners.

5. A pressurizable seal assembly according to claim 1, further wherein said at least one clip comprises the following:
   first and second sides disposed at a predetermined angle from one another; and
   first and second arcuate edges between said first and second sides;
   wherein said edges correspond to arcs defined by the intersection of said sides with a pair of concentric circles.

6. A pressurizable seal assembly according to claim 1, further comprising the following:
   a radial bore through said seal housing and in fluid communication with said annular chamber; and
   a fitting in said bore and attachable to a source of pressurized fluid to selectively pressurize said annular chamber.

7. A pressurizable seal assembly according to claim 1, further wherein said pressurized fluid is compressed air, and said fitting is adapted to be attached to shop air pressure, whereby the pressure in said chamber may be regulated.

8. A pressurizable seal assembly according to claim 6, further comprising the following:
   a second radial bore through said housing and in fluid communication with said chamber; and
   an accumulator adapted to engage said second bore and in fluid communication with said chamber, to selectively regulate the pressure in said chamber.

9. A pressurizable seal assembly according to claim 8, further wherein said accumulator comprises the following:
   a housing including a step longitudinal bore having first and second bore portions;
   a piston in said first bore portion, said first bore portion being open to pressure inside said annular chamber of said seal housing such that said pressure may act on a face of said piston to displace said piston axially in said bore;
   a tell-tale attached to a side of said piston opposite said face and extending through said second bore portion and out of said accumulator housing; and
   a resilient member in said second bore portion biasing said piston against said axial displacement due to pressure in said annular chamber;
   whereby the pressure in said chamber is held substantially constant.

10. A pressurizable seal assembly according to claim 1, further wherein:
    said annular chamber of said housing is defined by said inner circumference of said seal housing, a pair of side walls, and an annular outer wall substantially concentrically surrounding said open inner circumference; and
    an O-ring in sealing contact with said side walls and said seal member is concentrically disposed between said seal member and said annular outer wall.

11. A pressurizable seal assembly according to claim 10, further wherein said seal member is a length of packing material corresponding to the circumference of said rotary shaft.

12. A tandem seal assembly comprising the following:
    first and second primary seal means for affecting a sealed condition between a stationary housing and a rotary shaft;
    a seal housing between said first and second primary seal means and including a selectively pressurizable annular chamber having an open inner circumference surrounding said shaft;
    an annular seal member disposed in said chamber at said inner circumference and being actuable by pressure in said chamber to selectively sealingly engage said shaft;
    removal means for selectively permitting removal of said first primary seal means from an installed position without disturbing said annular seal member;
    whereby said annular seal member may be actuated to provide a temporary seal to assist said second primary seal means in affecting said sealed condition when said first primary seal means has been removed from said installed position.

13. A pressurizable seal according to claim 12, further wherein said seal housing is of a two-piece construction to facilitate its installation on, and removal from, said rotary shaft.

14. A pressurized seal according to claim 13, further wherein said seal housing is symmetrically split into generally C-shaped sections, said sections being selectively secured together by fasteners.

15. A tandem seal assembly according to claim 12, wherein said second primary seal means comprises a face seal mounted for rotation with said shaft, and said seal housing includes a receiving portion adapted to receive a stationary seal portion that engages said face seal.

16. In a device employing a tandem seal assembly including first and second primary seal means for affecting a sealed condition between a stationary housing and a rotary shaft and removal means for selectively permitting removal of said first primary seal means from an installed position, a method of maintaining a sealed condition between said shaft and said housing when said first primary seal means has been removed from said installed position, said method comprising the following steps:
    providing a selectively pressure-actuable seal between said first and second primary seals;
    actuating said pressure-actuable seal to sealingly engage said shaft;
    removing said first primary seal means without disturbing said second primary seal means; and
    operating said device while said pressure-actuable seal is in sealing engagement with said shaft.

17. A method according to claim 16, further comprising the following steps:
    replacing said first primary seal means to an installed position; and
    actuating said pressure-actuable seal to a position out of engagement with said shaft.

* * * * *